United States Patent
Gregg

(10) Patent No.: US 6,574,070 B2
(45) Date of Patent: Jun. 3, 2003

(54) MODEL REFERENCE GENERATOR FOR A DISC DRIVE

(75) Inventor: Jason D. Gregg, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/034,814

(22) Filed: Dec. 21, 2001

(65) Prior Publication Data

US 2003/0035241 A1 Feb. 20, 2003

Related U.S. Application Data

(60) Provisional application No. 60/311,449, filed on Aug. 9, 2001.

(51) Int. Cl.[7] .............................................. G11B 5/596
(52) U.S. Cl. .................................................. 360/78.09
(58) Field of Search ...................... 360/78.06, 77.03, 360/78.09, 77.08, 78.04

(56) References Cited

U.S. PATENT DOCUMENTS

| | | |
|---|---|---|
| 4,907,109 A | 3/1990 | Senio |
| 4,937,689 A | 6/1990 | Seaver et al. |
| 4,965,501 A | 10/1990 | Hashimoto |
| 5,182,684 A | 1/1993 | Thomas et al. |
| 5,262,907 A | 11/1993 | Duffy et al. |
| 5,276,662 A | 1/1994 | Shaver, Jr. et al. |
| 5,381,282 A | 1/1995 | Arai et al. |
| 5,585,976 A | 12/1996 | Pham |
| 5,631,999 A | 5/1997 | Dinsmore |
| 5,659,438 A | 8/1997 | Sasamoto et al. |
| 5,680,272 A | 10/1997 | Kadlec et al. |
| 5,847,895 A | 12/1998 | Romano et al. |
| 5,983,875 A | 11/1999 | Kitagawa et al. |
| 6,031,684 A * | 2/2000 | Gregg ..................... 360/78.06 |
| 6,091,567 A * | 7/2000 | Cooper et al. ........... 360/77.08 |
| 6,130,590 A * | 10/2000 | Kolsrud ..................... 333/174 |
| 6,236,895 B1 | 5/2001 | Romano et al. |
| 6,304,409 B1 * | 10/2001 | Allsup ..................... 360/77.03 |
| 2001/0014834 A1 | 8/2001 | Shah |

* cited by examiner

Primary Examiner—David Hudspeth
Assistant Examiner—Mitchell Slavitt
(74) Attorney, Agent, or Firm—Fellers, Snider, et al.

(57) ABSTRACT

An apparatus and method optimizing a model reference generator of a servo circuit to substantially mimic actual read/write head positions are disclosed. The servo circuit includes a microprocessor with associated random access memory storing a current profile and a set of optimized filter coefficients. The coefficients optimize a delay length of a finite impulse response filter, which delays passage of the current profile to a double integrator embedded in the microprocessor. The double integrator generates the substantially mimicked head positions. The filter coefficients are optimized by first, generating a model reference trajectory vector with a length determined by a set of empirically determined filter coefficients, then seek in an open loop mode while applying the selected current profile to the servo circuit to determine an actual trajectory vector, and replacing the empirically determined filter coefficient with an optimized filter coefficient determined from a mathematical comparison of the vector trajectories.

23 Claims, 4 Drawing Sheets

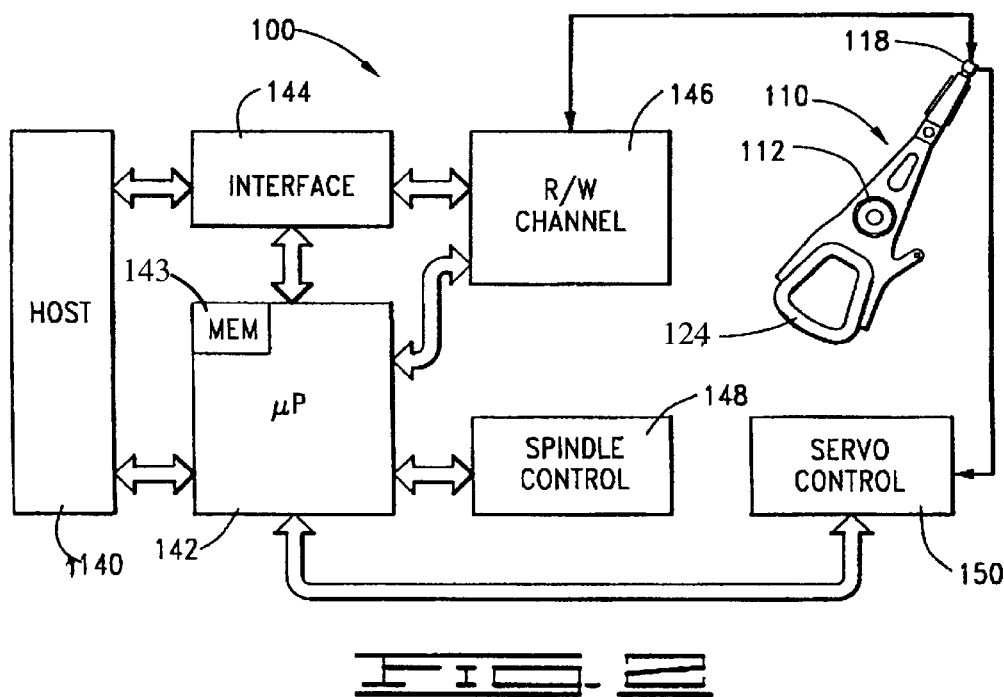
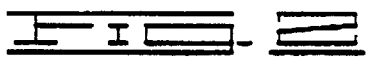
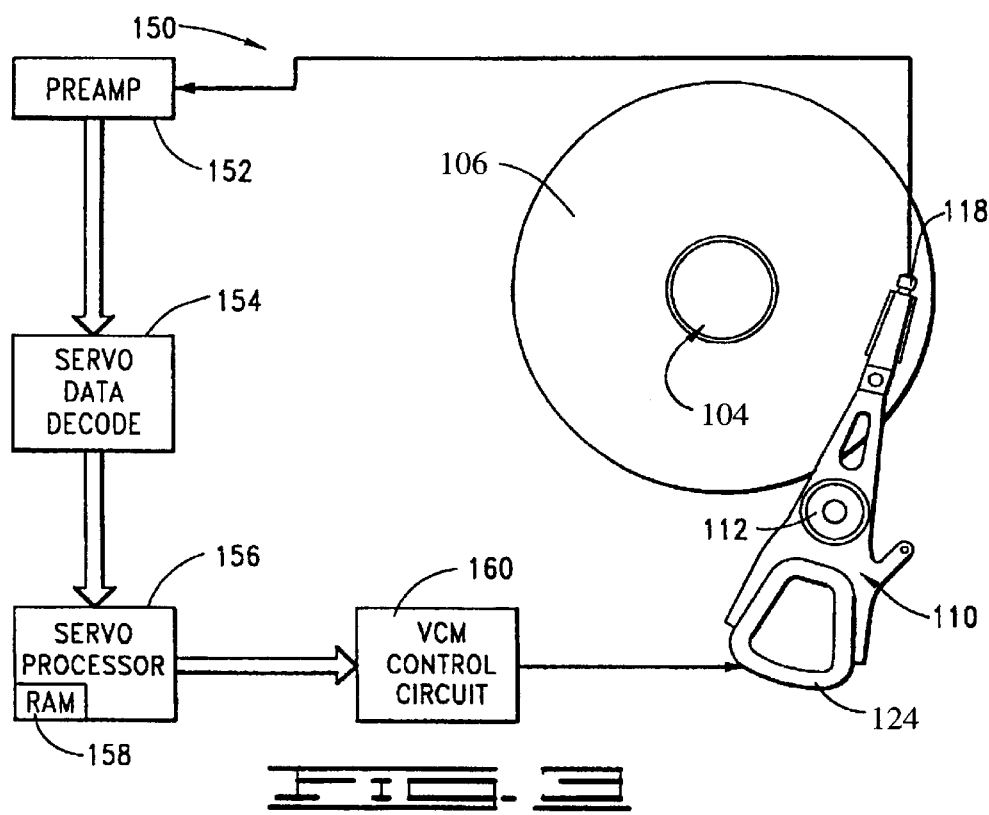
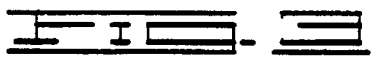

MODEL REFERENCE GENERATOR FOR A DISC DRIVE

RELATED APPLICATIONS

This application claims priority to U.S. Provisional Application No. 60/311,449 filed Aug. 9, 2001, entitled IMPROVED MODEL REFERENCE ACCURACY USING AN OPTIMIZED FIR FILTER.

FIELD OF THE INVENTION

This invention relates generally to the field of magnetic data storage devices, and more particularly, but not by way of limitation, to an improved model reference generator for a disc drive.

BACKGROUND

Disc drives are used for data storage in modern electronic products ranging from digital cameras to computer systems and networks. A typical disc drive includes a head-disc assembly (HDA) housing the mechanical portion of the drive, and a printed circuit board assembly (PCBA), attached to the head-disc assembly. The printed circuit board assembly controls operations of the head-disc assembly and provides a communication link between the head-disc assembly and a host device served by the disc drive.

Typically, the head-disc assembly has a disc with a recording surface rotated at a constant speed by a spindle motor assembly and an actuator assembly positionably controlled by a closed loop servo system. The actuator assembly supports a read/write head that writes data to and reads data from the recording surface. Disc drives using magneto resistive read/write heads typically use an inductive element, or writer, of the read/write head to write data to the information tracks and a magneto resistive element, or reader, to read data from the information tracks during drive operations.

One type of data recorded to and read from the information tracks is servo data. Servo data, including a physical track identification portion (also referred to as a servo track number or physical track number), written to the recording surface define each specific physical track of a number of physical tracks written on the recording surface.

A servo track writer is typically used in writing a predetermined number of physical tracks, also referred to as servo tracks, to each recording surface during the manufacturing process. The servo tracks are used by the closed loop servo system for controlling the position of the read/write head relative to the recording surface during disc drive operations, such a closed loop digital servo system is disclosed in U.S. Pat. No. 5,262,907 issued Nov. 16, 1993 to Duffy et al., assigned to the assignee of the present invention.

Seeking entails the movement of a selected head from an initial track to a destination track. For seeks of a sufficient length, a velocity-control approach is typically employed wherein the velocity of the head is repetitively determined and compared to a velocity profile which defines an optimum velocity trajectory for the head as it moves to the target track. The optimum velocity trajectory is typically provided by a model reference generator, such as the model reference generator disclosed in U.S. Pat. No. 6,031,684 to Gregg, assigned to the assignee of the present invention.

Model reference generators are designed to model a desired or expected response of the plant responding to a given input. For example, a model reference generator for a disc drive is designed to model an expected response of the head disc assembly to a seek command. The head disc assembly is the plant and the seek command is the given input. The seek command comes in the form of current profile applied to a voice coil motor of the head disc assembly. Those skilled in the art will recognize that the current profile is a modified one minus cosine reference current signal that includes both positive and negative current values to first accelerate and then decelerate the read/write head from the initial track to the destination track during a seek operation.

Based on a starting position of a read/write head, a double integrator of the model reference generator provides a reference velocity vector and a reference position vector representative of a velocity vector and position vector of the read/write head responding to a given current profile applied to the voice coil motor.

Generally, the use of the term optimum in describing a velocity trajectory of a model reference generator is used to denote the status of the model as a mathematical optimized model rather than to denote the model as being optimized to mimic the actual operation of the plant being model. In other words, the reference model is set up to provide an optimum model result for a theoretical plant based on an input current. For a disc drive, the theoretical plant is a mathematically optimized head disc assembly and the output from the model is an expected position and an expected velocity that theoretical read/write heads of the mathematically optimized head disc assembly would attain based on a starting position and velocity and a given level of input current.

Typically, the model reference generator is encoded within a servo microprocessor capable of performing double integration operations and is included as part of the model reference generator. As current is an approximation of acceleration, the first integral of an input current profile provides the velocity vector for the theoretical read/write heads and the second integral of the input current profile provides the position vector of the theoretical read/write heads of the mathematically optimized head disc assembly.

To execute a model reference seek, a current profile is provided to the voice coil motor and a model reference generator. During the model reference seek, the read/write head of the head disc assembly reads position information from the servo data written to the information tracks. The position information read by the read/write head during the model reference seek is used to generate an actual position vector indicative of the position of the read/write head. The actual position vector is compared to the position vector of the theoretical read/write heads provided by the model reference generator and corrections are made by the servo system to adjust the actual position of the read/write head to comply with the theoretical position of the read/write heads.

Typically, at pre-selected time intervals during the execution of the model reference seek, position observations of the read/write heads are made. Because of the disparity between the actual operation of the head disc assembly and the mathematically predicted operation of the head disc assembly position corrections for the read/write head are generally made for every position observations made. Extended seek times and elevated energy consumption result from the continual corrections made by the servo system to bring the position of the read/write heads into compliance with the mathematically determined reference position for the read/write heads.

Therefore, challenges remain and needs persist for means and steps for reducing the occurrence and degree of corrections made during a model reference seek to improve seek times and reduce energy consumption.

SUMMARY OF THE INVENTION

As exemplified by preferred embodiments, the present invention provides an improved model reference generator of a servo circuit for use in controlling the operation of a head disc assembly, also referred to herein as a plant, of a data storage device. The improved model reference generator is determined by providing an initial model reference generator, which includes an empirically determined filter coefficient contained in a table, to the servo system. Then a current profile is applied to the model reference generator and to the plant. The plant is operated in an open loop control mode while the current profile is applied to the plant and the response of the plant is observed while the plant is running in the open loop control mode. While the response of the plant running in the open loop control mode is observed, a response of the model reference generator to the application of the current profile to the model reference generator is determined. An optimized filter coefficient is determined from the response of the plant and the model reference generator to the application of the current profile. The empirically determined filter coefficient is replaced with the optimized filter coefficient to provide the improved model reference generator substantially replicating the operation of the plant for use in controlling the operation of the plant.

The servo circuit includes a microprocessor with an associated servo random access memory that stores a current profile and a set of optimized filter coefficients associates with the current profile. The optimized filter coefficients optimize a delay length of a finite impulse response filter, which delays passage of the current profile to a double integrator embedded in the microprocessor. The double integrator function of the microprocessor generates the substantially mimicked head positions.

These and various other features and advantages, which characterize the present invention, will be apparent from a reading of the following detailed description and a review of the associated drawings.

BRIEF DESCRIPTION OF THE DRAWINGS

FIG. 2 provides a functional block diagram of the disc drive of FIG. 1 operably connected to a host computer in which the disc drive is coupled.

FIG. 3 provides a functional block diagram of a servo control circuit shown in FIG. 2.

DETAILED DESCRIPTION

Figure 1:
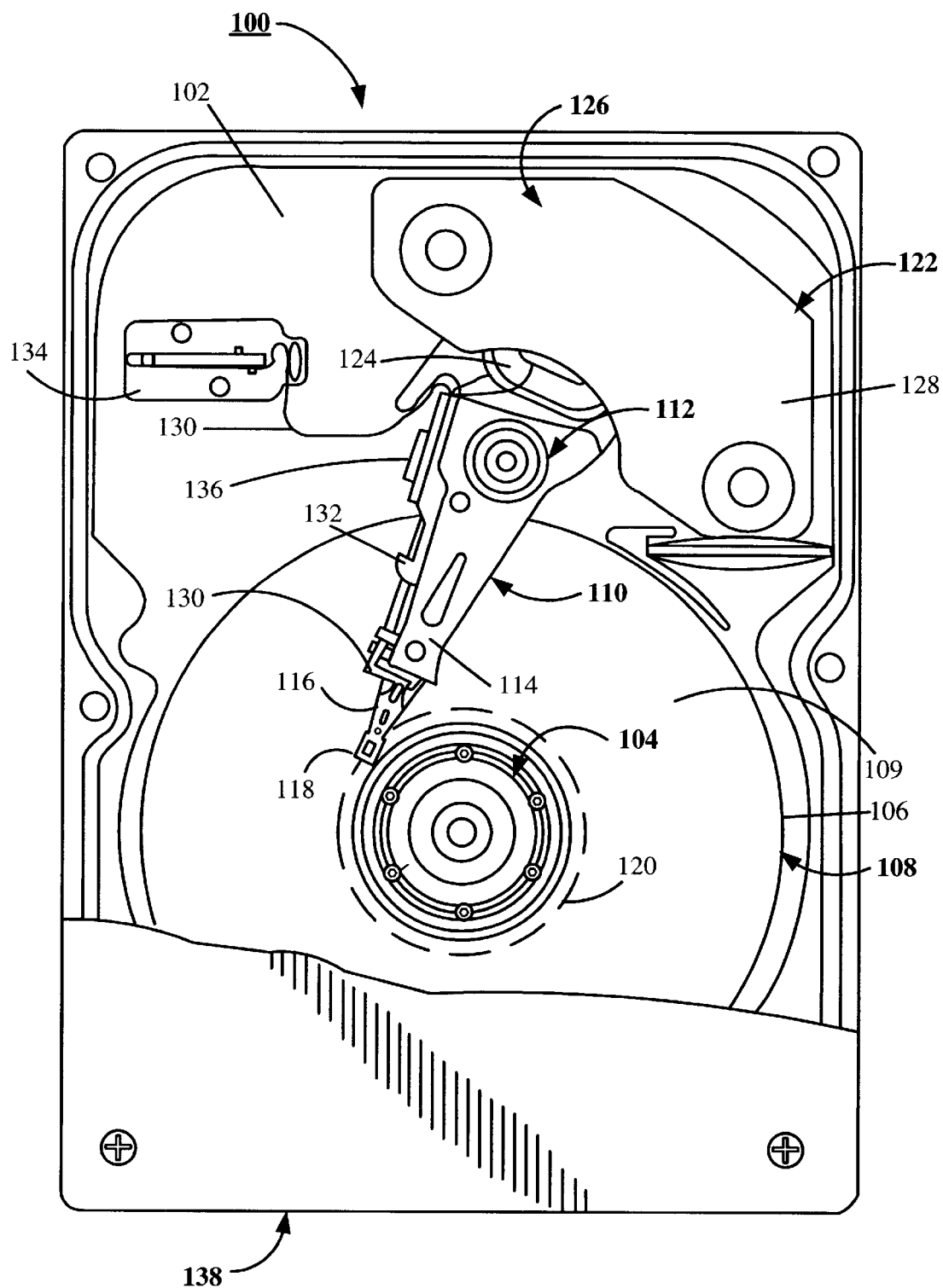
FIG. 1 is a top plan view of a data storage device with a model reference generator optimized in accordance with a method of the present invention to operate the data storage device.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description, as such, are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The head stack assembly 110 includes an actuator arm 114 that supports a load arm 116, which in turn supports at a read/write head 118 corresponding to the rotatable recording surface 109. The rotatable recording surface 109 is divided into concentric information tracks 120 (only one depicted) over which the read/write head 118 is positionably located. The information tracks 120 support head position control information written to embedded servo sectors (not separately depicted). Between the embedded servo sectors are data sectors (not separately depicted) used for storing bit patterns or data. The read/write head 118 includes a reader element (not separately shown) offset radially and laterally from a writer element (not separately shown). The writer element writes data to the concentric information tracks 120 during write operations of the disc drive 100, while the reader element controls the positioning of the read/write head 118 relative to the concentric information tracks 120 during operations of the disc drives 100.

The terms "servoing" and "position-controlling," as used herein, mean maintaining control of the read/write head 118 relative to the rotating recording surfaces 109 during operation of the disc drive 100. Servoing to or on the information track 120, the head stack assembly 110 is controllably positioned by a voice coil motor assembly 122 (also referred to a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor assembly 122. During operation of the disc drive 100, current passes through the actuator coil 124 forming an electromagnetic field, which interacts with the magnetic circuit of the voice coil motor assembly 122, causing the actuator coil 124 to move relative to the magnet assembly 126. As the actuator coil 124 moves, the head stack assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) mounted to the underside of the basedeck 102. The flex circuit containment channel 132 also supports read/write signal circuitry including preamplifier/driver (preamp) 136 used to condition read/ write signals passed between the read/write circuitry and the read/write head 118. The printed circuit board assembly provides the data storage device read/write circuitry that controls the operation of the read/write head 118, as well as other interface and control circuitry for the disc drive 100.

The data storage device 100 has two primary assemblies, the printed circuit board assembly and a head disc assembly 138 attached to the printed circuit board assembly. Typically, included within the head disc assembly 138 are the head stack assembly 110, the voice coil motor assembly 122 and the disc stack 108.

Turning to FIG. 2, shown therein is a functional block diagram of the disc drive 100 of FIG. 1, generally showing the main functional circuits which are resident on the printed circuit board assembly and used to control the operation of the disc drive 100.

The disc drive 100 is shown to be operably connected to a host device 140 in which the disc drive 100 is coupled in a conventional manner. Control communication paths are provided between the host device 140 and a disc drive microprocessor 142, the microprocessor 142 generally providing top level communication and control for the disc drive 100 in conjunction with programming stored in microprocessor memory (MEM) 143. The MEM 143 can include random access memory (RAM), read-only memory (ROM) and other sources of resident memory for the microprocessor 142.

Data is transferred between the host device 140 and the disc drive 100 by way of a disc drive interface 144, which includes a buffer to facilitate high speed data transfer between the host device 140 and the disc drive 100. Data to be written to the disc drive 100 is thus passed from the host device 140 to the interface 144 and then to a read/write channel 146, which encodes and serializes the data and provides the requisite write current signals to the read/write head 118. To retrieve data that has been previously stored by the disc drive 100, read signals are generated by the read/write head 118 and provided to the read/write channel 146, which performs decoding and error detection and correction operations and outputs the retrieved data to the interface 144 for subsequent transfer to the host device 140. Such operation of the disc drive 100 is well known in the art and discussed, for example, in U.S. Pat. No. 5,276,662 issued Jan. 4, 1994 to Shaver et al., assigned to the assignee of the present invention.

The discs 106 are rotated by a spindle control circuit 148, which electrically commutates the spindle motor assembly 104 (FIG. 1) through the use of back electromotive force (bemf) sensing. Spindle control circuits such as represented at 148 are well known and are discussed, for example, in U.S. Pat. No. 5,631,999 issued May 20, 1997 to Dinsmore, assigned to the assignee of the present invention.

The radial position of the read/write head 118 is controlled through the application of current to the actuator coil 124 of the actuator assembly 110. A servo control circuit 150, a functional block diagram of which is shown in FIG. 3, provides control of the radial position of the read/write head.

Referring now to FIG. 3, the servo control circuit 150 includes a preamp circuit 152 that includes the preamplifier/ driver 136 (of FIG. 1), a servo data and decode circuit 154, a servo microprocessor 156 with associated servo RAM 158 and a VCM control circuit 160, all of which cooperate in a manner to be discussed in greater detail below to control the position of the head 118.

The servo microprocessor 156 determines head position error from the relative magnitudes of the digital representations of the embedded servo sectors and, in accordance with commands received from the disc drive microprocessor 142 (FIG. 2), determines the desired position of the head 118 with respect to the disc 108. In response, the servo microprocessor 156 outputs a current command signal to the VCM control circuit 160, which includes an actuator driver that applies current of a selected magnitude and direction to the actuator coil 124 in response to the current command signal.

The embedded servo sectors are typically written to the discs 106 during the manufacturing of the disc drive 100 using a highly precise servo track writer. The embedded servo sectors serve to define the boundaries of each of the tracks and are divided circumferentially into a number of frames, with user data fields disposed therebetween. Because the sampling rate of the servo frames is generally insufficient to adequately control the positioning of the head 118, as described below a multi-rate observer is additionally deployed to provide estimates of head position, velocity and bias force so that corrections can be made in the positioning of the head 118 at times when the head 118 is over the user data fields between each pair of successive servo frames.

Figure 4:
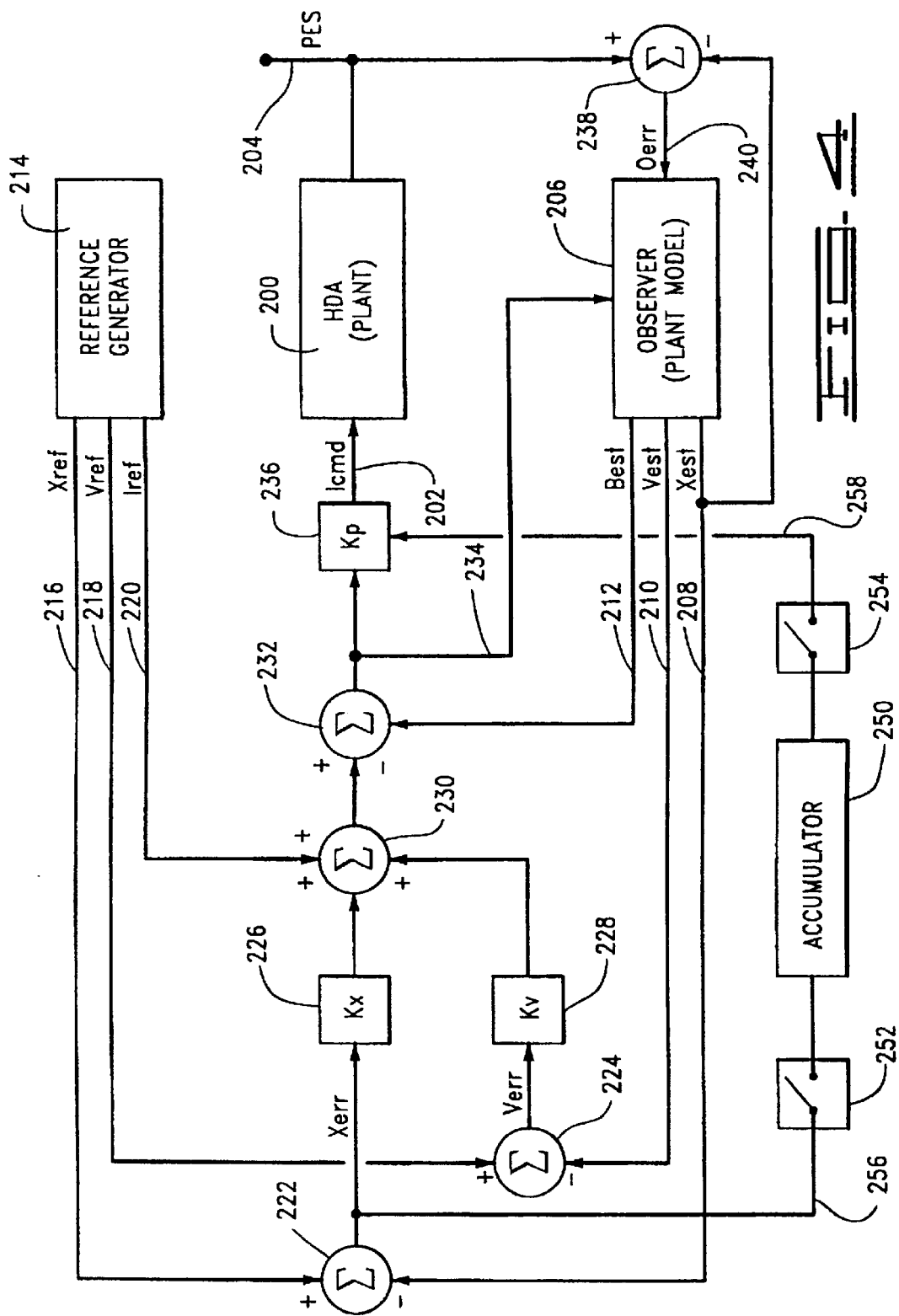
FIG. 4 is a control diagram for the disc drive servo control circuit of the disc drive of FIG. 1, portions of which are representative of functions carried out by the servo processor of FIG. 3.

Referring now to FIG. 4, shown therein is a generalized control diagram for the servo circuit 150 of FIG. 3. Portions of the control diagram of FIG. 4 can be readily implemented through appropriate programming utilized by the servo microprocessor 156.

As shown in FIG. 4, a portion of the disc drive 100 referred to as the "plant" is denoted by block 200 and generally comprises the servo circuit 150, the actuator assembly 110, a selected head 118 and the corresponding disc 108. The plant 200 receives a current command signal ("Icmd") on signal path 202 to position the head 118 adjacent a selected track. In response to servo information on the track, the plant 200 generates a position error signal (PES) that is output on signal path 204.

The control diagram of FIG. 4 also shows a multi-rate observer 206, or plant model, which is designed to have the same nominal input/output response characteristics as the plant 200. As will be recognized by those skilled in the art, the observer 206 generates a position estimate ("Xest"), a velocity estimate ("Vest") and a bias estimate ("Best") on signal paths 208, 210 and 212, respectively, which corresponds to estimates of head position, head velocity and bias force. The bias force estimate takes into account spring forces exerted upon the actuator as a result of the flexure assembly (such as 130 of FIG. 1) and windage forces upon the heads and is indicative of the amount of current required to maintain the selected head at the current position in view of such forces.

Additionally, a model reference generator 214 is provided which provides position reference ("Xref"), velocity reference ("Vref") and current reference ("Iref") signals indicative of the desired position, velocity and current settings for the plant 200. These signals are output on paths 216, 218 and 220, respectively and have values that generally depend upon the particular operational mode of the servo circuit, such as track following or seeking. As will be recognized, the current reference Iref is typically provided with a value of zero during track following, but as discussed below takes both positive and negative values during certain types of seeks in order to first accelerate and then decelerate the read/write head 118 from the initial track to the destination track.

A summing junction 222 determines a position error ("Xerr") as the difference between the position reference Xref and the position estimate Xest. Similarly, a summing junction 224 determines a velocity error ("Verr") as the difference between the velocity reference Vref and the velocity estimate Vest. The position error Xerr is provided to a gain block 226 having a scaler gain of Kx and the velocity error Verr is provided to a gain block 228 having a scaler gain of Kv, so that the output quantities are summed by a summing junction 230 (along with the current reference Iref).

The output of the summing junction 230 is further summed with the bias estimate Best at a summing junction 232, as shown. The output of the summing junction 232 is provided on signal path 234 as a control input to the observer 206 and is indicative of the amount of current to be applied to the plant 200.

The output of the summing junction 232 is further provided to a gain block 236 having a gain Kp, so that the output thereof comprises the current command Icmd signal on path 202. The gain block 236 provides the primary gain for the servo circuit 150 and is intended to ensure that the operational characteristics of the observer 206 closely model the characteristics of the plant 200.

The PES on signal path 204 is summed with the position estimate Xest on path 208 by a summing junction 238 to generate an observer error ("Oerr") signal as an input to the observer 206 on path 240. For reference, the observer 206 is a 4x observer, in that four sets of estimated parameters are output on the paths 208, 210 and 212 for each input of the observer error ("Oerr") signal. Thus, the observer provides a multi-rate of four times the sampling rate of the servo information from the discs 106.

An accumulator block 250 (also referred to as an "integrator" or "1/s" block) is additionally provided in the control diagram of FIG. 4, along with switches 252 and 254 which are provided in series with the accumulator block 250 and control the input of the position error ("Xerr") (along path 256), as well as the output of an updated gain Kp (along path 258) to the gain block 236.

Frequently, a model reference seek is performed using a modified one minus cosine (1−cos) reference current signal which is scaled to each particular seek length (i.e., the number of tracks in the seek). Those skilled in the art will recognize the modified one minus cosine reference current signal, also referred to as a current profile, includes both positive and negative current values to first accelerate and then decelerate the read/write head 118 from the initial track to the destination track during a seek operation. However, a variety of different reference currents may be used for the model reference seek. A square or sawtooth waveform or a waveform that has been optimized under some constraint, such as for minimal excitation or for minimum jerk, are examples of different reference currents that may be used for the model reference seek.

Normally, the model reference generator 214 is encoded within the servo microprocessor 156 and utilizes a current table, an encoded finite impulse response filter and a double integrator function of the microprocessor 156. The current table generally includes a current profile with an associated set of empirically determined filter coefficients, also referred to as filter taps. The current profile represents an amplitude and direction of current applied to the actuator coil 124 during execution of a seek command. The double integrator is used to generate the velocity reference ("Vref") signal as the first integral of the current profile, and the position reference ("Xref") signal as the second integral of the current profile. Because the microprocessor 156 can execute a double integration nearly instantaneously and provide a model reference position absent losses, the encoded finite impulse response filter is incorporated within the model reference generator 214 to delay operating on the value of the applied current with the double integration function of the microprocessor 156. The empirically determined filter taps determine a length of the finite impulse response filter. The length of the finite impulse response filter is intended to model the expected time delay and losses that typically occurs between application of current to the actuator coil 124 and the response of the voice coil 126 to position the read/write head 118 to a predetermined position, at a predetermined velocity over a predetermined period of time.

At pre-selected time intervals during the execution of the model reference seek, the read/write head 118 of the head disc assembly 138 reads position information from the embedded servo sectors. Based on the position information read by the read/write head 118 at a particular pre-selected time interval, the servo microprocessor 156 generates an actual position of the read/write head 118 relative to the disc 106. Additionally, the servo microprocessor 156 generates a model reference position for the read/write head 118 based on the applied current and the length of the encoded finite impulse response filter. The model reference position is the typical position the read/write head 118 should have attained at that particular pre-selected time interval. A comparison is made between the actual position and the reference position of the read/write head 118 at summing junction 222, which serves as the basis for making corrections to the current command signal Icmd on signal path 202 to bring the actual position of the read/write head into compliance with the reference position of the read/write head.

In a preferred embodiment, the model reference generator 214 is encoded within the servo microprocessor 156 and utilizes a current table with at least one current profile, an encoded finite impulse response filter associated with each current profile, and a double integrator. The double integrator is provided by a double integrator function of the microprocessor 156. Each current profile within the current table has an associated initial set of empirically determined filter coefficients. The double integrator is used to generate the velocity reference ("Vref") signal, expressed as a model velocity reference vector, as the first integral of the current profile, and the position reference ("Xref") signal, expressed as a model reference position trajectory vector, as the second integral of the current profile. Each initial set of empirically determined filter coefficients determines the length of the finite impulse response filter (expressed as a vector) for each current profile. The length of the finite impulse response filter vector determines an amount of delay applied to a selected current profile prior to the selected current profile being operated on by the double integrator function of the microprocessor 156.

In the preferred embodiment a current profile of the current table is selected and applied to the voice coil motor assembly 122 and to the model reference generator 214. An open loop model reference seek is performed without the finite impulse filter in the model reference generator, which in practical terms means there is no delay in the model. At pre-selected time intervals during the open loop model reference seek, the read/write head 118 of the head disc assembly 138 reads position information from the embedded servo sectors. Based on the position information read by the read/write head 118, the servo microprocessor 156 generates an actual position trajectory vector followed by the read/write head 118 during the open loop seek. For each selected time interval, the servo microprocessor 156 generates the model reference position trajectory vector based on the selected current profile.

In determining the improved model reference generator for the selected current profile, a set of optimized filter coefficients is determined for the selected current profile. To determine the set of optimized filter coefficients for the selected current profile, the actual position trajectory vector is compared to the model reference position trajectory vector by the following technique.

Let X represent the model reference position trajectory vector, let P represent the actual reference position trajectory vector, let N represent the length of X and P, let M represent the length if the finite impulse response filter vector, and let F represent the set of optimized filter coefficients. Construct a matrix, X. The number of rows of the matrix, X is determined by the number of predicted positions used to determine the length of the model reference position trajectory vector, the number of columns of the matrix, X is determined by the number initial empirically determined filter coefficients defining the length of the finite impulse response filter, the number of predicted positions used to determine the length of the model reference position trajectory vector is greater than the number initial empirically determined filter coefficients defining the length of the finite impulse response filter and the values in the columns are delayed versions of the model reference position trajectory vector X.

The matrix, X takes the form of:

$$X = \begin{vmatrix} X_1 & 0 & \cdots & 0 & 0 \\ X_2 & X_1 & \cdots & 0 & 0 \\ \cdots & \cdots & \cdots & \cdots & \cdots \\ X_{N-1} & X_{N-2} & \cdots & X_{N-M-1} & X_{N-M} \\ X_N & X_{N-1} & \cdots & X_{N-M-2} & X_{N-M-1} \end{vmatrix}$$

An over-determined system of linear equations is written in matrix form:

$$XF = P \qquad (1)$$

Which is solved to find the optimum filter coefficients, F:

$$F = X^{-1}P \qquad (2)$$

A least mean squared technique has been found to be useful in solving the resulting system of linear equations. In particular, the system of equations can be solved using the least squares fit portion of MATLAB®, is a software package from MathWorks used for complex mathematical computing.

Figure 5:
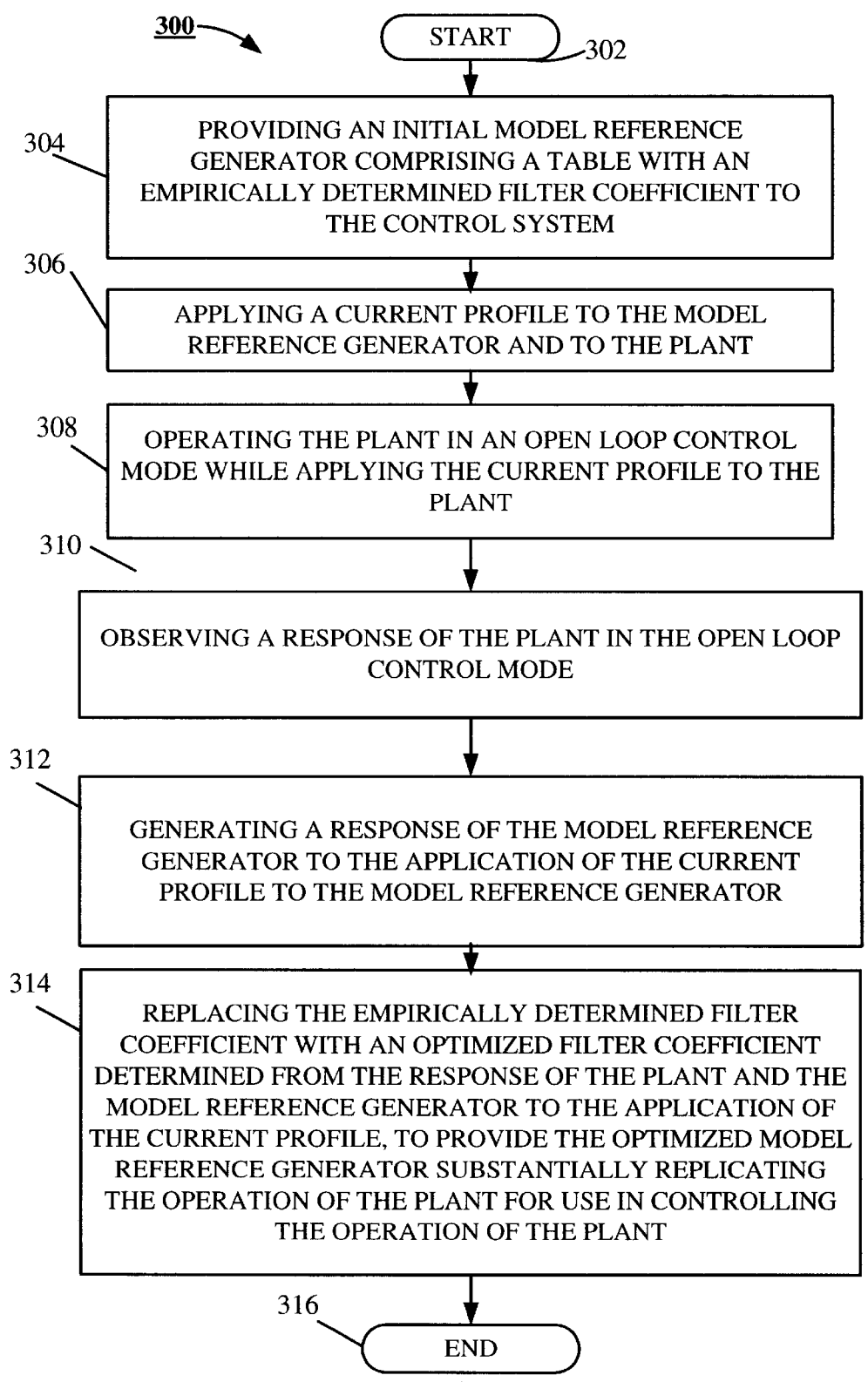
FIG. 5 is a flow chart of a method used in optimizing a filter coefficient for use by the servo processor of FIG. 3 to provide a model reference generator optimized to mimic the actual response of a head disc assembly of the disc drive of FIG. 1 to a seek command.

FIG. 5 depicts a model reference optimization process 300 for providing an improved model reference generator for use by a disc drive (such as 100). The improved model reference generator substantially replicates an operation of a plant (such as head disc assembly 138) of the disc drive. The model reference optimization process 300 beginning at start process step 302. The model reference optimization process 300 continues at process step 304 where a model reference generator (such as 214) is provided. The model reference generator includes table with an empirically determined filter coefficient. At process step 306, a current profile is applied to the plant and to the model reference generator.

The plant is operated in an open loop control at process step 308, while the current profile is applied to the plant and a response of the plant to the application of the current profile to the plant is observed in process step 310, and in process step 312 a response of the model reference generator to the application of the current profile to the model reference generator is determined.

The model reference optimization process 300 continues at process step 314 where the empirically determined filter coefficient is replaced with an optimized filter coefficient determined from the response of the plant and the model reference generator to the application of the current profile to the model reference generator and the plant. Inclusion of the optimized filter coefficient through replacement of the empirically determined filter coefficient in the table of the model reference generator results in the improved model reference generator substantially replicating the operation of the plant.

Following process step 314, the model reference optimization process 300 concludes at end process step 316.

Accordingly, the present invention is directed to a method for providing an improved model reference generator substantially replicating an operation of a plant (such as 138) of a data storage device (such as 100) for use in controlling the operation of the plant. In accordance with one embodiment, steps of providing a model reference generator comprising a table with an empirically determined filter coefficient (such as step 304); applying a current profile to the model reference generator and to the plant (such as step 306); operating the plant in an open loop control mode while applying the current profile to the plant (such as step 308); observing a response of the plant to the application of the current profile to the plant (such as step 310); determining a response of the model reference generator to the application of the current profile to the model reference generator (such as step 312); and replacing the empirically determined filter coefficient with an optimized filter coefficient determined from the response of the plant and the model reference generator to the application of the current profile to the model reference generator and the plant (such as step 314) are preformed to provide the improved model reference generator substantially replicating the operation of the plant for controlling the operation of the plant.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method of determining an improved model reference generator of a control system substantially replicating an operation of a plant of a data storage device for use in controlling the operation of the plant comprising steps of:

(a) providing an initial model reference generator to the control system, the initial model reference generator comprising a table with an empirically determined filter coefficient;

(b) applying a current profile to the model reference generator and to the plant;

(c) operating the plant in an open loop control mode while applying the current profile to the plant;

(d) observing a response of the plant in the open loop control mode;

(e) generating a response of the model reference generator to the application of the current profile to the model reference generator; and (f) replacing the empirically determined filter coefficient in the table with an optimized filter coefficient determined from the response of the plant and the response of model reference generator to the application of the current profile, the improved model reference generator comprising the table with the optimized filter coefficient.

2. The method of claim 1, in which the plant includes a microprocessor, and in which the initial model reference generator further comprises a finite impulse response filter and a double integrator, the finite impulse response filter encoded in the microprocessor, the microprocessor having a double integrator function for use as the double integrator, the finite impulse response filter passing the current profile to the double integrator function, the double integrator function generating a model reference position vector based on the current profile passed to the model reference generator.

3. The method of claim 2, in which the empirically determined filter coefficient is a set of empirically determined filter coefficients, and in which the finite impulse response filter comprises the set of empirically determined filter coefficients, the set of empirically determined filter coefficients defining a delay length of finite impulse response filter, and further in which the table further comprising a plurality of current profiles, and still further in which the set of empirically determined filter coefficients is a plurality of sets of empirically determined filter coefficients.

4. The method of claim 3, in which each current profile of the plurality of current of current profiles is associated with a set of empirically determined filter coefficients of the plurality of sets of empirically determined filter coefficients, and in which the finite impulse response filter delays passage of the current profile to the double integrator, wherein the length of the delay based on the length of the finite impulse response filter.

5. The method of claim 1, in which the plant is a head disc assembly.

6. The method of claim 1, in which the control system includes a microprocessor, the model reference generator further comprises a finite impulse response filter encoded in the microprocessor, the microprocessor having a double integrator function, the empirically determined filter coefficient is a set of empirically determined filter coefficients, wherein a delay length of the finite impulse response filter determined by the set of empirically determined filter coefficients, the plant is a head disc assembly with a recording surface, the observed response of the head disc assembly is an actual position trajectory vector with a length determined by a plurality of observed positions of the read/write head read from the recording surface during application of the current profile to the head disc assembly, the generated response of the model reference generator is a model reference position trajectory vector generated by the double integrator function of the microprocessor operating on the current profile applied to the model reference generator, and in which the optimized filter coefficient of replacing step (f) is a set of optimized filter coefficients determined by steps comprising:

(f1) defining a relationship between the plurality of predicted positions of the read/write head and a length of the finite impulse response filter;

(f2) comparing the actual position trajectory vector to the relationship between the plurality of predicted positions of the read/write head and a length of the finite impulse response filter factored by the set of optimized filter coefficients to be determined; and (f3) operating on the actual position trajectory vector with an inverse of the relationship between the plurality of predicted positions of the read/write head and a length of the finite impulse response filter factored by the set of optimized filter coefficients to be determined to determine the set of optimized filter coefficients.

7. The method of claim 6, in which the relationship between the plurality of predicted positions of the read/write head and the set of empirically determined filter coefficients of defining step (f1) is a matrix wherein rows of the matrix are determined by the number of predicted positions used to determine the length of the model reference position trajectory vector and wherein the columns of the matrix are determined by the length finite impulse response filter.

8. A data storage device comprising:
   a basedeck supporting a spindle motor assembly;
   a disc with at least one recording surface, the disc attached to the spindle motor assembly;
   an actuator assembly supported by the basedeck, the actuator assembly having a read/write head rotationally positionable adjacent the recording surface, the read/write head comprising a read element for reading data from the recording surface and a write element for writing data to the recording surface; and
   a servo circuit comprising:
      a microprocessor with an associated random access memory;
      a current table with a current profile, the current table stored in the random access memory;
      a double integrator function embedded in the microprocessor;
      a finite impulse response filter encoded in the microprocessor providing a finite impulse response vector; and
      a length of the finite impulse response filter determined by a set of filter coefficients optimized to substantially mimic the response of the actuator assembly, the set of filter coefficients optimized to substantially mimic the response of the actuator assembly stored in the current table.

9. The data storage device of claim 8, in which the actuator assembly further having an actuator coil responsive to the application of the selected current profile for rotationally positioning the read/write head relative to the recording surface.

10. The data storage device of claim 8, in which the set of filter coefficients optimized to substantially mimic the response of the actuator assembly is a plurality of sets of filter coefficients optimized to substantially mimic the response of the actuator assembly, and in which the current profile is a plurality of current profiles, each set of filter coefficients optimized to substantially mimic the response of the actuator assembly of the plurality of sets of filter coefficients optimized to substantially mimic the response of the actuator assembly associated with one of the current profiles of the plurality of current profiles.

11. The data storage device of claim 8, in which the finite impulse response filter operates to delay passage of the selected current profile to the double integrator function of the microprocessor.

12. A method of determining an improved model reference generator comprising the steps of:
   (a) providing an initial model reference generator to a control system, the initial model reference generator comprising a table with a first filter coefficient;
   (b) operating a plant of the control system in an open loop mode while applying to the plant and the initial model reference-generator a current profile determined by the first filter coefficient;

(c) replacing the first filter coefficient in the table with an optimized filter coefficient determined from an observed response of the plant and the model reference generator to the applied current profile.

13. The method of claim 12, wherein the providing step comprises realizing the initial model reference generator in programming utilized by a programmable microprocessor.

14. The method of claim 12, wherein the providing step comprises providing the initial model reference generator with a double integrator.

15. The method of claim 14, wherein the operating step comprises using the double integrator to generate a model reference position vector in response to the current profile.

16. The method of claim 15, wherein the operating step further comprises determining an actual position vector of the head in response to application of the current profile to the actuator.

17. The method of claim 16, wherein the replacing step comprises generating the optimized filter coefficient in relation to the model reference position vector and the actual position vector.

18. The method of claim 14, wherein the providing step further comprises providing the initial model reference generator with a finite impulse response filter, and wherein the operating step further comprises using the finite impulse response filter to delay passage of the current profile to the double integrator.

19. A data storage device, comprising:

a rotatable data storage surface;

an actuator supporting a data transducing head adjacent the surface; and a servo system which positions the head with respect to the surface using an optimized model reference generator obtained by providing an initial model reference generator having a first filter coefficient, applying a current profile determined by the first filter coefficient to the actuator and to the initial model reference generator, and replacing the first filter coefficient with an optimized filter coefficient determined from an observed response of the actuator and the initial model reference generator to the applied current profile.

20. The data storage device of claim 19, wherein the servo system comprises a programmable microprocessor and wherein the optimized model reference generator is realized in programming utilized by the microprocessor.

21. The data storage device of claim 19, wherein the initial model reference generator comprises a double integrator which generates a model reference position vector in response to the current profile.

22. The data storage device of claim 21, wherein the optimized filter coefficient is determined in relation to the model reference position vector and an actual position vector of the head in response to application of the current profile to the actuator.

23. The data storage device of claim 21, wherein the initial model reference generator further comprises a finite impulse response filter which delays passage of the current profile to the double integrator.

* * * * *